UNITED STATES PATENT OFFICE.

JOHANN JAKOB BRACK, OF BASLE, SWITZERLAND, ASSIGNOR TO L. DURAND, HUGUENIN & CO., OF ST. FONS, FRANCE, BASLE, SWITZERLAND, AND HÜNINGEN, GERMANY.

POLYAZO YELLOW DYE.

SPECIFICATION forming part of Letters Patent No. 519,522, dated May 8, 1894.

Application filed January 17, 1894. Serial No. 497,163. (Specimens.) Patented in France December 2, 1892, No. 226,107, and in England December 2, 1892, No. 9,182.

*To all whom it may concern:*

Be it known that I, JOHANN JAKOB BRACK, a citizen of the Swiss Republic, residing at Basle, Switzerland, have invented certain Improvements in the Manufacture of Polyazo Coloring-Matters, (for which patents have been granted to me in France, No. 226,107, dated December 2, 1892, and in England, No. 9,182, dated December 2, 1892,) of which the following is a specification.

This invention relates to the production of certain novel polyazo-coloring matters derived from dioxydiphenylmethane, obtained by the condensation of formaldehyde with ordinary phenol in presence of a condensation agent, such, for instance, as hydrochloric acid.

These coloring matters are obtained by the combination of one molecule of dioxydiphenylmethane with two molecules of certain diazo-compounds, of which at least one is the intermediate product resulting from the combination of one molecule of sulfanilic acid with one molecule of the tetrazo-derivative of a paradiamin, such as benzidin and tolidin. The two molecules of the diazo-compounds may be of the same or different natures. One of them may be a simple diazo-compound, such, for instance, as the chlorid of diazo-benzen, diazo-benzen sulfonic acid, &c.

I attribute to the coloring matter obtained from the combination of one molecule of dioxydiphenylmethane and two molecules of the intermediate product resulting from the union of equivalent quantities of tetrazo-diphenyl and sulfanilic acid, the following formula:

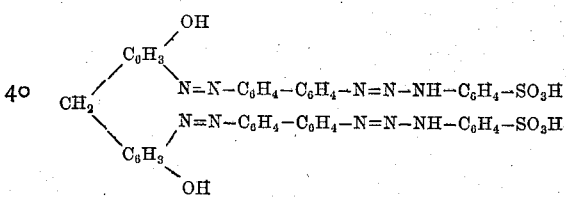

and to the coloring matter resulting from the combination of one molecule of the chlorid of diazo-benzene with one molecule of dioxydiphenylmethane and one molecule of the product resulting from the union of equivalent quantities of tetrazo-diphenyl and sulfanilic acid, I attribute the formula:

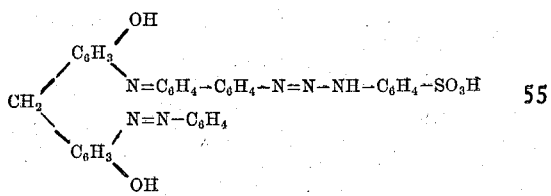

I will now proceed with the description of the process of manufacture of several of these coloring matters, the constitution of which are typified by the preceding formula.

I. *Coloring matter produced by the condensation of one molecule of dioxydiphenylmethane with two molecules of the intermediate product resulting from the union of equivalent quantities of tetrazo-diphenyl and sulfanilic acid.*—18.4 kilos of benzidin are diazotized in the usual way by means of 13.8 kilos of sodium nitrite and sixty kilos of hydrochloric acid at 21° Baumé. The tetrazo-compound thus obtained is poured into a solution of 19.5 kilos of sulfanilate of soda and forty kilos of acetate of soda in five hundred liters of water, care being taken to thoroughly agitate the same. The intermediate product obtained at the end of two or three hours is introduced into a solution of ten kilos of dioxydiphenylmethane, 3.5 kilos of caustic soda and fifty kilos of carbonate of soda in five hundred liters of water. After leaving the mass to itself for a short time, it is heated to ebullition and the coloring matter is precipitated by the addition of sea-salt. The coloring matter thus produced is, when dried, in the form of a reddish brown powder, readily soluble in water and dissolving in concentrated sulfuric acid with a reddish violet coloration.

II. *Coloring matter produced by the combination of one molecule of dioxydiphenylmethane, one molecule of the intermediate product resulting from the union of equivalent quantities of tetrazo-diphenyl and sulfanilic acid and one molecule of the chlorid of diazo-benzene.*—The intermediate product prepared as in the preceding example is introduced into a solution of twenty kilos of dioxydiphenylmethane, seven kilos of caustic soda and forty kilos of carbonate of soda in five hundred liters of water. After a short time there are added to this mixture forty kilos more of carbonate of soda and a solution of chlorid of diazo-benzene obtained from 9.3 kilos of anilin, thirty kilos of hydrochloric acid and 6.9 kilos of sodium nitrite. The mass is then left standing for several hours after which it is heated to 60° or 70° centigrade, to complete the reaction and the product is then filtered. The coloring matter thus obtained dissolves with difficulty in hot water and is preferably used in the form of a paste. The dyes obtained from this coloring matter are distinguished from those obtained from commercial Congo yellow by their resistance to the action of acids and alkalies.

III. *Coloring matter produced by the combination of one molecule of dioxydiphenylmethane with one molecule of the intermediate product resulting from the reaction of equivalent quantities of tetrazo-diphenyl and sulfanilic acid and one molecule of diazo-benzene sulfonic acid.*—In the preparation of this coloring matter for the 9.3 kilos of anilin employed in the preceding example 19.5 kilos of sulfanilate of soda are substituted. The coloring matter thus obtained is readily soluble in hot water and is only precipitated from a neutral solution of large addition of sea salt. When dried the coloring matter appears as a deep brown powder which when dissolved in concentrated sulfuric acid imparts thereto a brown coloration.

IV. *Coloring matter produced by the combination of one molecule of dioxydiphenylmethane with one molecule of the intermediate product resulting from the reaction of equivalent quantities of tetrazo-diphenyl and sulfanilic acid and one molecule of the intermediate product resulting from the union of equivalent quantities of tetrazo-diphenyl and naphthionic acid.*—To the product obtained according to the second example by the union of one molecule of dioxydiphenylmethane with one molecule of the intermediate product derived from the tetrazo-diphenyl and sulfanilic acid are added forty kilos of carbonate of soda and to this mixture is added the intermediate product obtained by the union of 18.4 kilos of benzidin, sixty kilos of hydrochloric acid, 13.5 kilos of sodium nitrite, 24.5 kilos of sodium naphthionate and forty kilos of acetate of soda. The mixture is left to itself for some time after which it is heated to ebullition and the coloring matter formed is precipitated by the addition of sea salt. When dried this coloring matter is in the form of a deep brown powder, readily soluble in hot water, and dissolving in concentrated sulfuric acid with a grayish violet coloration.

These coloring matters produced as above described dye cotton in an alkaline bath a yellowish or yellowish red tint without the use of a mordant.

Having thus described my invention, I claim—

1. The herein described process of manufacturing polyazoic coloring matters which consists in combining one molecule of dioxydiphenylmethane with two molecules of diazo-compounds, one of said compounds constituting the intermediate product resulting from the union of one molecule of sulfanilic acid with one molecule of the tetrazo-derivative of a paradiamin such for instance as benzidin, substantially as set forth.

2. The herein described process of manufacturing polyazoic coloring matters which consists in combining one molecule of dioxydiphenylmethane with two molecules of the intermediate product resulting from the union of one molecule of sulfanilic acid with one molecule of tetrazo-diphenyl, substantially as set forth.

3. The herein described polyazoic coloring matter derived from the combination of dioxydiphenylmethane with sulfanilic acid and tetrazo-diphenyl which dyes unmordanted cotton in an alkaline bath yellow and which in its dry state is a brown powder soluble in water and soluble in sulfuric acid with a reddish violet coloration, substantially as set forth.

In witness whereof I have hereunto signed my name in the presence of two subscribing witnesses.

JOHANN JAKOB BRACK.

Witnesses:
GEORGE GIFFORD,
AMAND RITTER.